Figure 1:
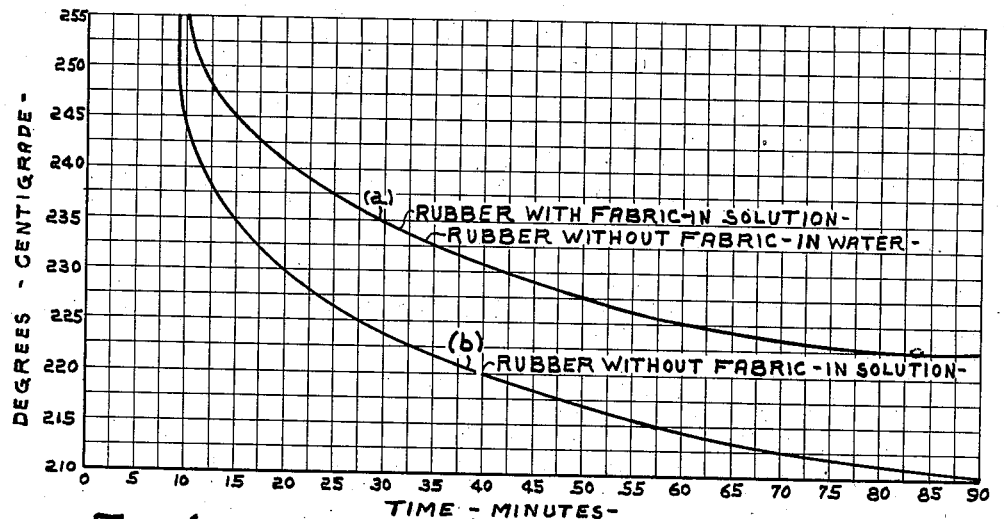

June 23, 1942.  A. G. FEDERMAN  2,287,095
PROCESS OF DEGRADING RUBBER
Filed Oct. 28, 1939

INVENTOR
ALBERT G. FEDERMAN.
BY
ATTORNEY

Patented June 23, 1942

2,287,095

UNITED STATES PATENT OFFICE 2,287,095

PROCESS OF DEGRADING RUBBER

Albert G. Federman, Chester, Pa.

Application October 28, 1939, Serial No. 301,788

2 Claims. (Cl. 260—720)

This invention relates to the degrading of rubber, more particularly to waste rubber products such as discarded auto tire casings and inner tubes, and has for an object the provision of an improved process for such degrading.

Heretofore, two primary methods of degrading waste rubber have been known. The first of these involves the use of chemicals or solvents and has proved rather unsatisfactory in that it is not only very expensive, but frequently injures the rubber. The second known method provides for subjecting the waste material, while submerged in water, to a temperature of 250° C. or higher for a period of from about a half an hour to about an hour, or even longer.

The present invention relates to a method of the latter type, but differs therefrom in several respects, including that the temperature and the time may both be materially reduced, and that a fluid other than water may be used with satisfactory results.

Figure 2:
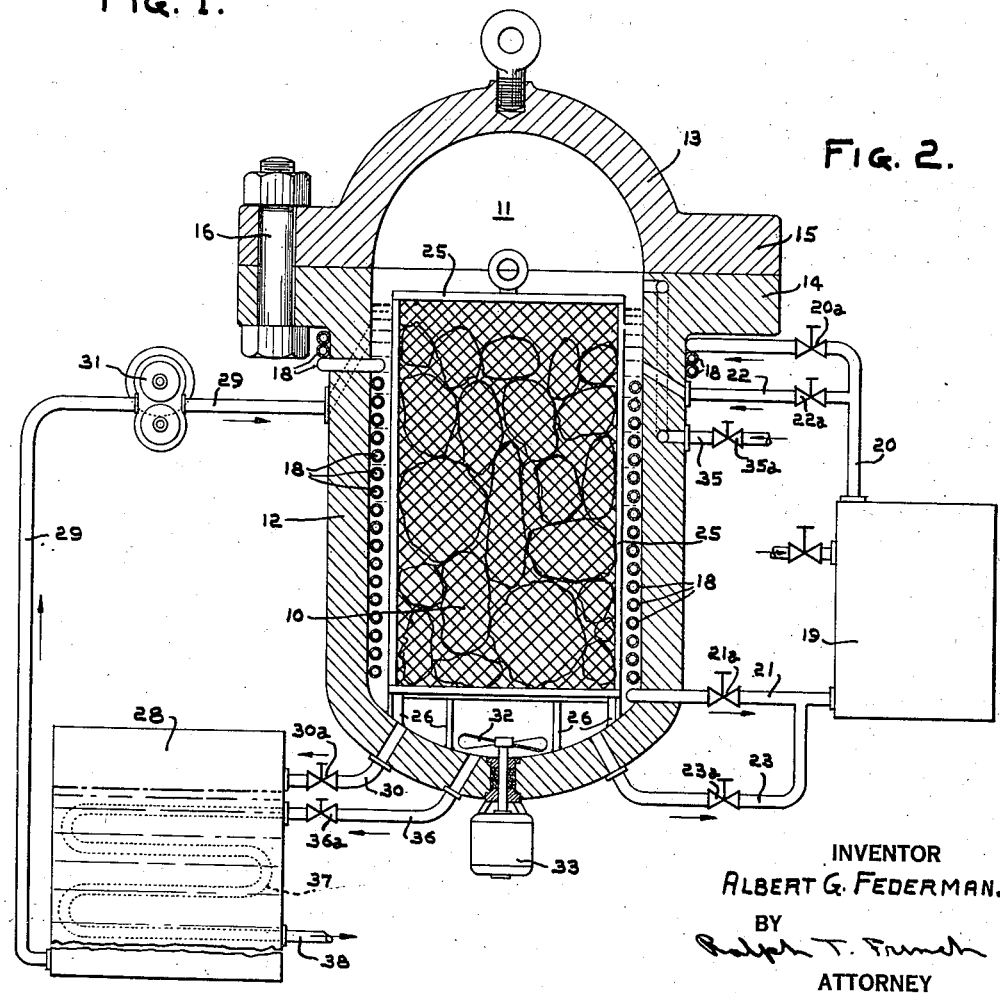

In the drawing:

Fig. 1 is a temperature-time chart for the degrading of various types of waste rubber in accordance with the invention; and, Fig. 2 is a vertical view, partially in section, of apparatus suitable for use in practicing the invention.

Preferably, I place the rubber product 10 to be degraded in an autoclave, as at 11, of any suitable construction, and, under some circumstances, as where auto tire casings constitute the material to be degraded, I may find it desirable to reduce the size of the same, as by cutting or chopping.

The apparatus illustrated in Fig. 2 includes an autoclave 11 comprised by a cylindrical body portion 12 having an opening at its upper end adapted to be closed by the dome-shaped cover 13. The body and cover portions 12 and 13 are provided with flanges 14 and 15, respectively, adjacent their meeting surfaces, for the reception of suitable fastening means, such as the bolts 16.

Heat for the autoclave is provided by means of the coiled tube 18. While, in the illustration, I have shown some of the coils outside of the autoclave and others within the same, it will be apparent that all of the coils may be within or without the autoclave, if desired. A heating fluid, preferably steam, is supplied to the coils 18 for travel therethrough, from the boiler 19 by means of the conduit 20, the fluid returning to the boiler through the conduit 21. The conduits 20 and 21 are provided with branches 22 and 23, respectively, providing for communication from the boiler directly to the interior of the autoclave.

Flow of fluid from the boiler to the autoclave and back through the conduits 20, 21, 22 and 23 is controlled by the valves 20a, 21a, 22a and 23a, respectively. By closing valves 22a and 23a, the heating fluid from the boiler 19 is caused to pass through the coils 18. When these valves are opened and valves 20a and 21a are closed, the heating fluid flows through the chamber within the autoclave, in direct contact with the charge of rubber therein.

Preferably, I provide an open mesh basket or cartridge 25 for holding the charge of rubber 10. Any suitable means, such as the frame 26, serves to support the basket 25 in spaced relation to the bottom of the autoclave, for a purpose to be hereinafter described.

In order that the rubber may be heated in the presence of a solution, as is frequently desirable, I provide a reservoir 28 having supply and return conduits 29 and 30, respectively, for flow of solution to and from the autoclave. A valve 30a is located in the conduit 30, whereby return of the solution to the reservoir during treatment of the rubber, is prevented. The solution may be forced through the conduit 29 to the autoclave in any desired manner, as by use of the gear pump 31.

Disposed within the autoclave, preferably in the space between the bottom of the basket 25 and the bottom of the autoclave, is an agitator 32 driven by the motor 33, for maintaining the solution at uniform strength by circulation and agitation thereof.

Means are provided for washing and cooling the rubber after treatment and prior to removal from the autoclave, and include a water supply conduit 35, controlled by the valve 35a, and communicating with the interior of the autoclave at a point above the basket 25. The washing and cooling water is discharged from the autoclave through the conduit 36, controlled by the valve 36a. Preferably, the conduit 36 has a portion of its length formed as a heating coil 37 disposed in the reservoir 28, so that the heat absorbed by the water in cooling the rubber may be transferred to the fluid in the reservoir, rather than wasted with discard of the water. After the water has given up its heat, it may be discharged at 38.

In operation, the basket 25 is filled with rubber to be treated and placed in the autoclave where it is submerged in fluid supplied from the reservoir 28. This fluid, together with the rubber therein, is heated by steam from the boiler 19 to secure and maintain the desired temperature. When the rubber has been heated for the desired period of time, the heating fluid from the boiler is shut off, the fluid in the autoclave is returned to the reservoir and water from the supply conduit 35 is directed to the interior of the autoclave to wash and cool the rubber prior to its removal, the water discharging through the conduit 36, coil 37 and conduit 38, whereby the heat taken from the rubber and autoclave is transferred to the fluid in the reservoir 28. After proper washing and cooling, the charge of rubber is removed from the autoclave, a fresh charge is inserted, and the process repeated.

Under certain conditions it may be undesirable to omit the step of washing and cooling the rubber in the autoclave, in which case the rubber is removed from the autoclave while hot and a new charge immediately inserted. The treated charge, or a number of such charges, may be washed and cooled exteriorly of the autoclave in any desired manner. This practice has the advantage that it is not necessary to completely reheat the autoclave for each charge of rubber.

As previously indicated, I may heat the rubber by direct contact of steam from the boiler 19. Also, by supplying a relatively small quantity of solution from the reservoir 28 to the autoclave, the solution may be changed to a vapor for contact in that form with the rubber.

An important feature of the invention is the particular fluid in the reservoir for contact with the rubber. Where the rubber to be processed contains no fabric or other foreign matter such as is present in auto tire casings, satisfactory results may be obtained by the use of water, preferably distilled water. As previously indicated, this water may contact the rubber while in the form of steam. When water is used, regardless of its form, the most economical operation is at a temperature within the range of 225° C. to 245° C. for a period of from fifteen minutes to one hour, the time varying inversely as the temperature. Thus, at 225° C. the time required to completely degrade the rubber is approximately one hour, while with the temperature increased to 245° C. the time is reduced to about fifteen minutes. If the temperature is raised to about 255° C., the time is further reduced to ten minutes. Theoretically, the time would be reduced to less than ten minutes if the temperature were raised beyond 255° C., but in actual practice a minimum of about ten minutes is necessary due to the time required for the heat to penetrate to all points in the material being processed.

Consideration of curve $a$ on the chart of Fig. 1 will disclose that while, as mentioned above, the most economical operation in reclaiming rubber without fabric in the presence of water is between 225° C. and 245° C., satisfactory results may be obtained with temperatures slightly below this range.

Under certain conditions it may be more economical to submerse the charge of rubber in the autoclave in a relatively cold liquid under a pressure of about 600 pounds per square inch. By starting with unheated liquid at such a pressure, the boiling point thereof is increased, whereby it is possible to heat the rubber to the required temperature without the necessity of supplying the latent heat present if the liquid is boiled, as would be the case if the liquid were not under such pressure. I have calculated that operation at a pressure of about 600 pounds per square inch will effect a saving of about 50%. A further advantage of this manner of operating is the possible avoidance of large losses of liquid due to evaporation.

Generally, I prefer to use as my direct contact fluid within the autoclave, a solution of calcium chloride, altho other salts or other alkali or alkaline earth chlorides may prove useful. I have found that from a 30% to a 70% solution will produce satisfactory results.

By using such a solution, I am able to degrade rubber with fabric, for example, auto tire casings, under the same conditions of temperature and time as when treating rubber without fabric with water. Therefore, in Fig. 1, curve $a$ represents not only conditions for rubber without fabric where water is the contacting fluid, but also conditions where rubber with fabric is treated with a solution.

As indicated by curve $b$ in Fig. 1, when the solution is used as the contacting medium for rubber without fabric, best results are obtained with a temperature range of 215° C. to 245° C., the time varying from one hour to ten minutes.

The material obtained by degrading rubber under the conditions hereinbefore disclosed may be termed a solid, as distinguished from a paste or a liquid. When the waste rubber is heated to a temperature of about 290° C. with a calcium chloride solution, the resulting material is soft and sticky, and as such is suitable for paints, inks, cements, etc.

A particularly important result of the use of calcium chloride solution in the degrading of rubber for use in the manufacture of paints, inks, cements, etc., is that at about 290° C. there is a tendency for the calcium chloride to chlorinate the rubber. The chlorinated rubber paste, when mixed with a vehicle of the dichloro pentanes group, results in a very quick-drying product.

While I have disclosed my invention as having several embodiments, it will be obvious to those skilled in the art that it is not so limited, but is susceptible of various other modifications without departing from the spirit thereof, and I desire, therefore, that only such limitations shall be placed thereupon as are imposed by the prior art or as are specifically set forth in the appended claims.

What I claim is:

1. In the degrading of rubber from waste rubber products, the step of subjecting the rubber product to a temperature of from about 210° C. to about 245° C. by the application of heated aqueous vapor directly thereto.

2. In the treatment of rubber for use in the manufacture of paints, inks, cements, and the like, the step of subjecting the rubber to a temperature of about 290° C. by the application of heated calcium chloride vapor directly thereto, whereby the rubber is degraded and chlorinated.

ALBERT G. FEDERMAN.